United States Patent
Munro et al.

(10) Patent No.: US 7,318,619 B2
(45) Date of Patent: Jan. 15, 2008

(54) METHOD AND APPARATUS FOR REDUCING DRAG AND NOISE FOR A VEHICLE

(75) Inventors: Alexander S. Munro, Bloomfield Hills, MI (US); Andrew J. Mazurkiewicz, Sterling Heights, MI (US)

(73) Assignee: Munro & Associates, Troy, MI (US)

(*) Notice: Subject to any disclaimer, the term of this patent is extended or adjusted under 35 U.S.C. 154(b) by 230 days.

(21) Appl. No.: 11/033,983

(22) Filed: Jan. 12, 2005

(65) Prior Publication Data

US 2005/0163963 A1 Jul. 28, 2005

Related U.S. Application Data

(60) Provisional application No. 60/535,985, filed on Jan. 12, 2004.

(51) Int. Cl.
*B62D 37/02* (2006.01)

(52) U.S. Cl. .................. 296/180.1; 244/200; 244/133; 416/223 R; 114/67 R

(58) Field of Classification Search ............. 296/180.1, 296/180.2, 180.3, 180.4, 180.5; 244/198, 244/200, 99.12, 133, 130, 123.1; 428/90; 416/223 R; 114/67 R
See application file for complete search history.

(56) References Cited

U.S. PATENT DOCUMENTS

| | | | |
|---|---|---|---|
| 1,903,823 A * | 4/1933 | Lougheed | 244/200 |
| 2,857,654 A | 10/1958 | Sexton | |
| 3,846,200 A | 11/1974 | Doerfling et al. | |
| 4,867,503 A * | 9/1989 | Luksch et al. | 296/217 |
| 5,263,233 A | 11/1993 | Kim et al. | |
| 5,385,774 A | 1/1995 | Cramer et al. | |
| 5,618,588 A | 4/1997 | Alm | |
| 6,106,920 A | 8/2000 | Pichon et al. | |
| 6,123,616 A | 9/2000 | Otsuka | |
| 6,365,794 B1 | 4/2002 | Dabi et al. | |
| 6,499,797 B1 | 12/2002 | Bohm et al. | |
| 6,544,596 B2 | 4/2003 | Clemens et al. | |

* cited by examiner

*Primary Examiner*—Joseph D. Pape
(74) *Attorney, Agent, or Firm*—Harness, Dickey & Pierce, L.L.P.

(57) ABSTRACT

A body part including a surface having a fluid flow thereover. The body part also includes flocking coupled to at least a portion of the surface that adjusts an aerodynamic characteristic relative to the surface that is devoid of the flocking.

45 Claims, 10 Drawing Sheets

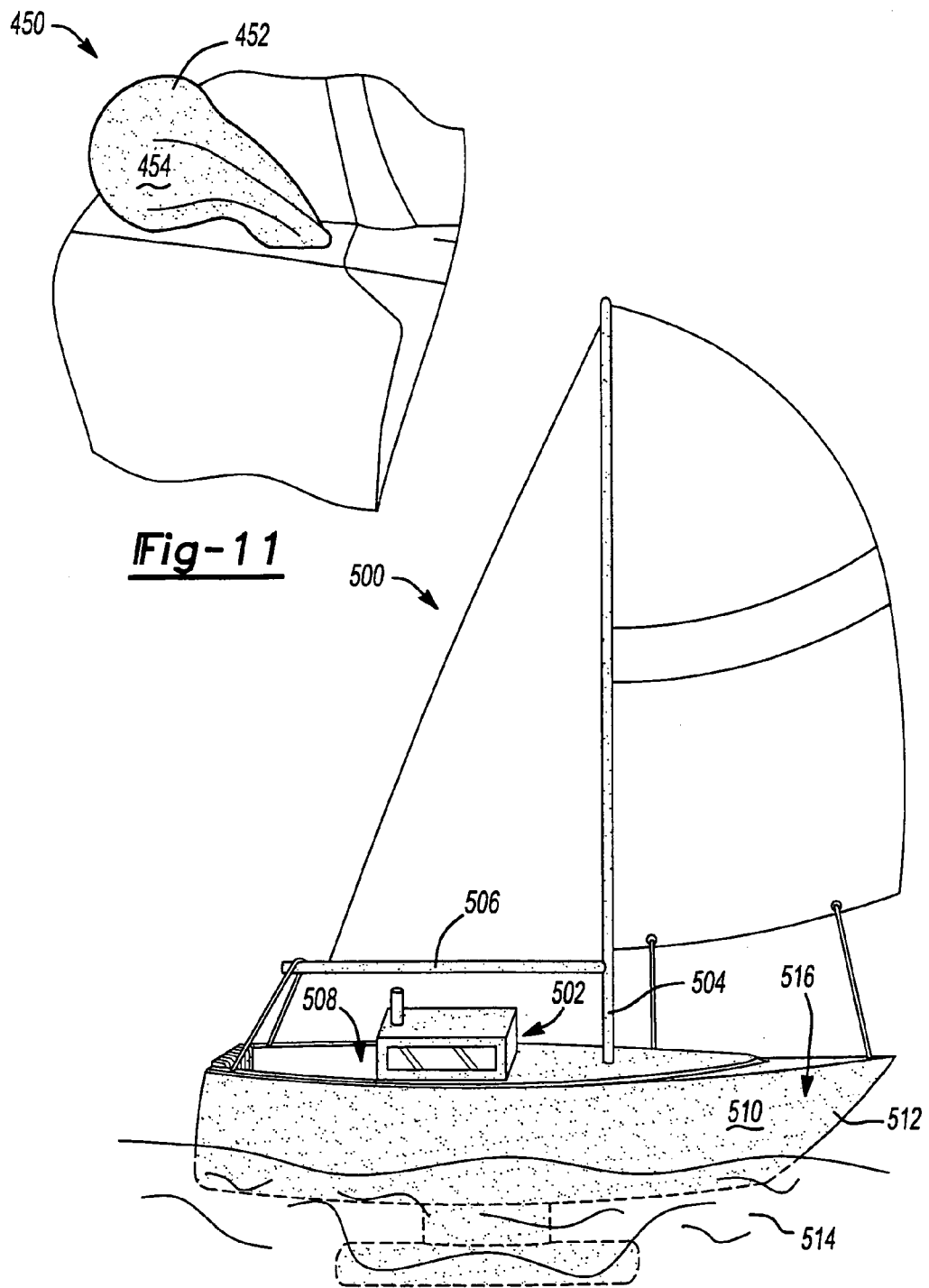

METHOD AND APPARATUS FOR REDUCING DRAG AND NOISE FOR A VEHICLE

CROSS-REFERENCE TO RELATED APPLICATIONS

This application claims the benefit of U.S. Provisional Application No. 60/535,985, filed on Jan. 12, 2004. The disclosure of the above provisional application is incorporated by reference as if fully set forth herein.

FIELD OF THE INVENTION

The present invention relates to a coating on a surface and more particularly to flocking an aerodynamic surface to relatively improve an aerodynamic characteristic of the surface including reduced drag and noise.

BACKGROUND OF THE INVENTION

The term "surface flocking" refers to a process of permanently attaching fibers to a surface. The end result is a "fuzzy" surface that is velvety to the touch. Flocking was originally invented hundreds of years ago to protect fragile objects from normally hard surfaces. First uses of surface flocking include jewelry boxes and body armor interior. Over the past few decades, it was discovered that surface flocking could be used to keep loose items from rattling inside automobile glove boxes and coin holders. Within the last few years it was discovered that surface flocking possesses excellent noise and vibration dampening qualities, and could be used to reduce the famous "bump, rattle, and squeak". This has lead to a whole array of new applications including shock mounting brackets, sunroof tracks, seals and Heating Ventilation and Cooling (HVAC) ducts. Surface flocking is a popular alternative for acoustical dampening because it is inexpensive, lightweight, thin and generally does not require any design alterations of the original part.

The present teachings provide new applications of surface flocking, and, in particular, surface flocking for altering the aerodynamic characteristics of various vehicles, structures and components thereof as described below.

SUMMARY OF THE INVENTION

A body part including a surface having a fluid flow thereover. The body part also includes flocking coupled to at least a portion of the surface that adjusts an aerodynamic characteristic relative to the surface that is devoid of the flocking.

In one feature, the aerodynamic characteristic includes drag and the flocking coupled to at least the portion of the surface decreases the drag thereover relative to the surface that is devoid of the flocking.

In another feature, the aerodynamic characteristic includes noise and the flocking coupled to at least the portion of the surface decreases the noise therefrom relative to the surface that is devoid of the flocking.

In still another feature, the aerodynamic characteristic includes volumetric flow over the surface and the flocking coupled to at least the portion of the surface increases the volumetric flow thereover relative to the surface that is devoid of the flocking.

In yet another feature, the aerodynamic characteristic includes lift and the flocking coupled to at least the portion of the surface increases the lift produced by the airfoil for a predetermined range of angle of attack relative to the surface that is devoid of the flocking for the same range of angle of attack.

Further areas of applicability of the present invention will become apparent from the detailed description provided hereinafter. It should be understood that the detailed description and specific examples, while indicating the various embodiments of the invention, are intended for purposes of illustration only and are not intended to limit the scope of the invention.

BRIEF DESCRIPTION OF THE DRAWINGS

The present invention will become more fully understood from the detailed description, the appended claims and the accompanying drawings, wherein:

FIG. 11 is a perspective view of a side mirror on an exemplary vehicle according to the present teachings showing flocking over the entire side mirror cowling;

FIG. 12 is a perspective view of a sail boat according to the present teachings showing flocking over predetermined surfaces;

DETAILED DESCRIPTION OF THE VARIOUS EMBODIMENTS

The following description of the various embodiments is merely exemplary in nature and is in no way intended to limit the invention, its application or uses.

Figure 1:
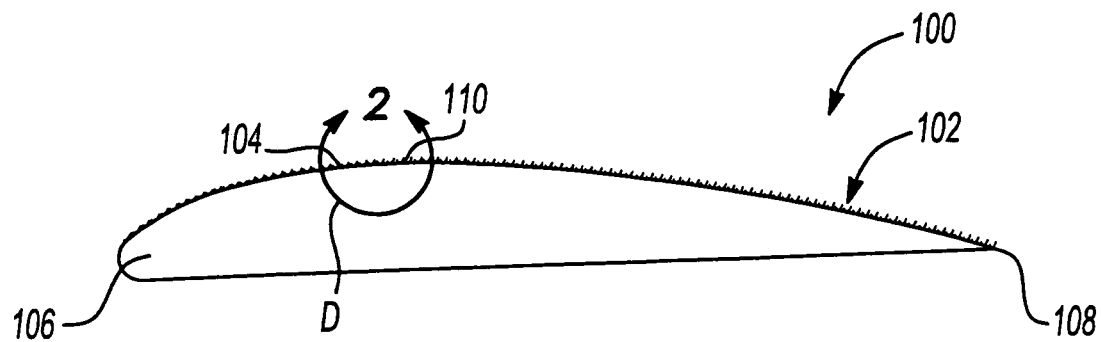
FIG. 1 is a sectional view of a vehicle body part according to the present teachings.

FIG. 1 illustrates a section of a body part 100 of a vehicle having an external surface 102 that includes a flocked portion 104. Although an airfoil is illustrated in FIG. 1, the body part 100 could be any part of an airplane or waterborne vessel, such as a wing, a propeller blade, a tail portion, a rudder portion, a hydrofoil or any other body portion including a fuselage or aeronautical component that has an external surface 102. The body part 100 may also be a part of various different types of vehicles, including but not limited to automobiles (cars, trucks, and the like), as well a part of any type of watercraft, boat or aircraft. The external surface 102 is defined herein as a surface exposed to the environment during the operation of the vehicle. In an exemplary application in which the vehicle is an aircraft, the external surface 102 is exposed during operations such as taxiing, landing, take-off, flying, etc, such that the design of the external surface 102 may affect aerodynamic characteristics of the aircraft, vehicle or vessel including lift, drag, noise, vibration and/or combinations thereof. The body part 100, in the aircraft example, may have a leading edge 106 and a trailing edge 108 relative to the aircraft's flying direction.

Figure 2:
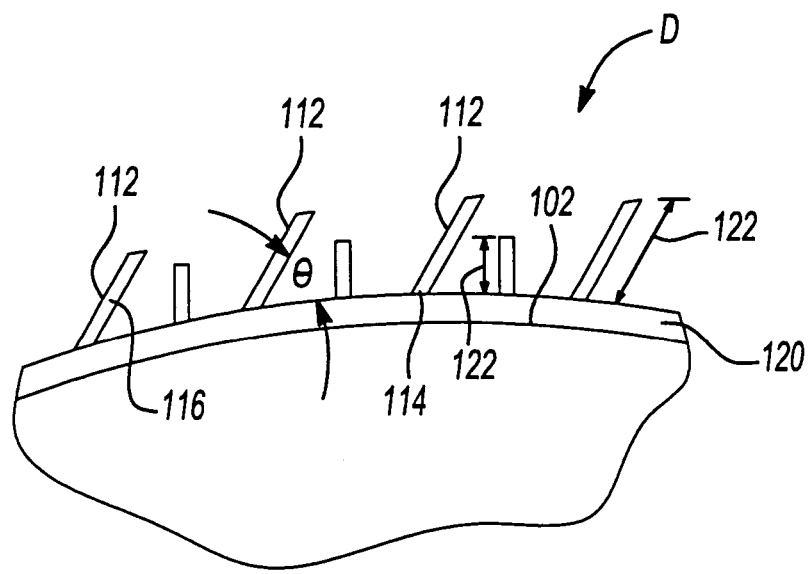
FIG. 2 is an enlarged view of Detail D of FIG. 1.

Referring to FIGS. 1 and 2, the external surface 102 of the body part 100 includes the flocked portion 104 having flock 110. It will be understood that the flocked portion 104 may also extend over the entire external surface 102 or predetermined portions thereof (i.e., the flocked portion 104). As will be below described, the flock 110 or flocking 110 may be selected to alter an aerodynamic characteristic of the body part 100 in a desired fashion relative to the external surface 102 that is devoid of flocking 110. The aerodynamic characteristics may include lift, drag, flow resistance, noise, vibration, etc. and combinations thereof.

The flock 110 includes a plurality of fibers 112, which are attached to the external surface 102 of the body part 100 by various known flocking processes. The fibers 112 may be selected from a variety of materials, taking into consideration their durability under the environmental conditions experienced during operation of the vehicle as well as any aerodynamic considerations. Examples of fiber materials include various textile materials, such as cotton, nylon, rayon, polyester, but also, polyethylene, polyamide, acrylic, glass, coal, metal, carbon fiber and other natural and/or synthetic fibers 112. Flock fibers 112 may be milled or cut. Milled flock fibers 112 are generally produced from textile waste materials. Cut flock fibers 112 are produced from first quality filament materials. The cutting process produces a very uniform length of flock 110. The fibers 112 may have a length in a range from 0.3 millimeters to 5.0 millimeters and a yarn density of 1.7 decitex to 22 decitex (1.5 denier to 19.8 denier) from various cutting processes known in the art. It will be appreciated that various flock lengths, widths and densities may be used. It will also be appreciated that various flock lengths, widths and densities may be used on a single surface. In one embodiment, the flock fibers are made of Nylon 66.

Flocking may be applied to the external surface 102 after an adhesive coating 120 is applied to the external surface 102. A variety of adhesives is available and may be used to attach any type of flock 110 to any type of external surface 102, including metallic and/or composite material surfaces. Examples of adhesives include, but are not limited to, acrylic resin, urethane resin, epoxy resin and/or other polymerizable resins. Adhesives may also be single-component, two-component, and/or water based.

The flock 110 may be applied to adhesive-coated surfaces by various methods, including mechanical, electrostatic, or combinations thereof. The flock 110 may also be sprayed using an air compressor, a reservoir and a spray gun similar to spraying paint, particularly for flocking large surface areas. The mechanical methods may be air-blown or beater-bar methods. Electrostatic flocking may incorporate a pneumatic-assisted process that propels the fibers 112 toward the coated surface in an air stream.

Flocking the body part 100 may be done, for example, using a standard automated electrostatic flocking process. Briefly, the body part 100 is sprayed with a sufficiently strong adhesive, using, for example, a multi-axis robotic arm. After the external surface 102 (or a portion thereof 104), of the body part 100 is evenly coated, the body part 100 is clamped, and an electrostatic charge is applied to it. In some applications, the fibers 112 may be charged using a friction charging process (i.e., a tribocharging method) rather than electric current. The fibers 112 may be randomly dusted over the external surface 102, or portion 104 thereof, at a desired flocking density, such as, for example, 50 fibers per square millimeter to 300 fibers per square millimeter. The charge causes the fibers 112 to be attached at one end 114 (FIG. 2) and stand up like carpet pile, substantially perpendicularly to the external surface 102.

The fibers 112 may also be applied, if desired, at a given orientation angle (e.g., an angle θ, as shown in FIG. 2) relative to the external surface 102. Depending on the application process and the applied charge, if any, the fibers 112 may be substantially parallel to each other, perpendicular to the external surface 102, inclined at a desired angle (i.e., the angle θ) and/or combinations thereof. For example, the fibers 112 may be oriented in a direction from the leading edge 106 to the trailing edge 108, with the angle θ being an acute angle for aerodynamic, aeronautical and/or other considerations.

After the flocking 110 is fully applied, the adhesive coating 120 may be processed for permanently bonding the fibers 112 to the surface 102. Depending on the adhesive used, heat to cause polymerization or cross-linking or other curing processes may be applied to the adhesive coating 120 using known methods. Excess, loose and/or poorly bonded fibers 112 may be removed by vacuuming, air blowing, and/or shaking the surface.

The flock 110 may be selected to alter an aerodynamic characteristic of the body part 100 in a desirable way relative to a surface devoid of flocking 110. The particular flock material, the process of flocking, the density of the flock 110, the orientation of the flock fibers 112, the width of the flock fibers 112 and/or the length of the flock fibers 112, for example, may (alone or in combination) alter aerodynamic characteristics of the body part 100. As an example, a flock length 122 (FIG. 2) may be easily controlled, regardless of flock material, flocking process, etc. The effect of flock length 122 on various aerodynamic characteristics is illustrated in comparative graphs in FIG. 3-FIG. 5, produced by testing four identical body parts 100.

The four body parts 100 of this example are NACA 2412 airfoils tested in a low-speed, wind tunnel at the University of Michigan having a two-foot (about 0.6 meters) by two-foot (about 0.6 meters) test section. NACA 2412 airfoils are often used as baseline wing designs for general aviation airplanes. Three of the four airfoils are flocked over their entire external surface 102 using an automated electrostatic flocking process. Each of the three airfoils are flocked with short fibers 124, medium fibers 126 and long fibers 128 (FIGS. 3-5), respectively, having, for example, respective lengths of 0.5 mm, 1.0 mm, and 2.5 mm. The fourth airfoil is unflocked 130, and serves as a control. The aerodynamic characteristics selected in the example are drag and lift. The drag coefficient $C_d$, the lift coefficient $C_l$ and the ratio $C_l/C_d$ are shown (along the y-axis) in FIG. 3-FIG. 5 as functions of angle of attack "α" (along the x-axis). The free stream velocity of the above described tests was about 26.3 m/s (about 58.8 mph), and the Reynolds number (Re) is around 50,000.

Figure 4:
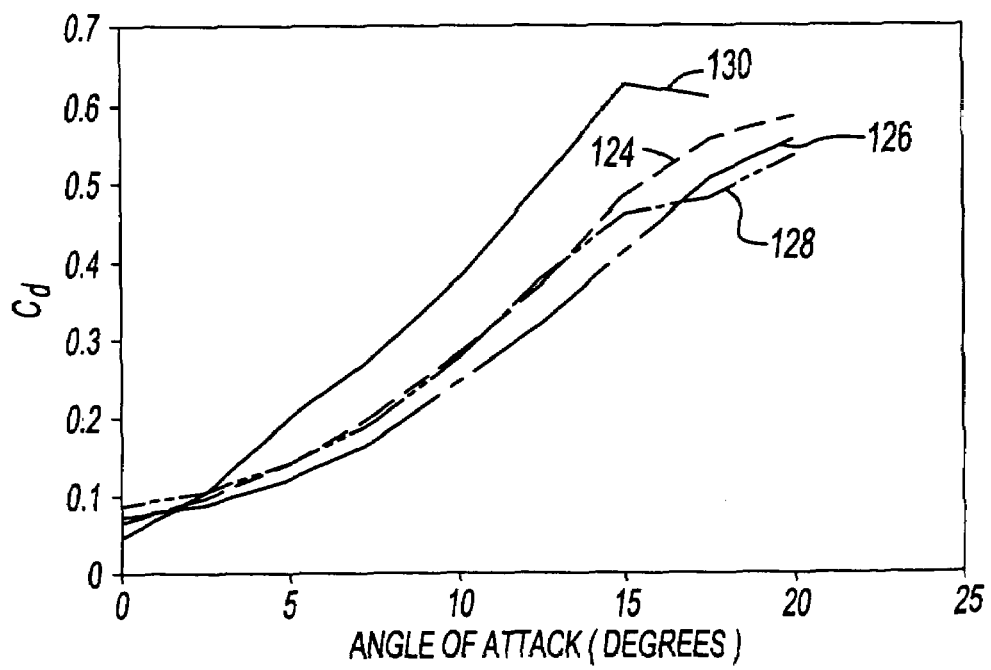
FIG. 4 is a comparison graph of a drag coefficient versus the angle of attack for the airfoil having the three different flock lengths.

Referring to FIG. 4, which shows the graph of coefficient of drag ($C_d$) versus angle of attack (α) for the tested airfoils, flocking reduces the drag of the tested airfoils possibly because flocking 110 attached the airfoil increases surface roughness. This may be similar to the golf ball effect, where the dimples on the ball cause a controlled turbulent airflow around the ball (not shown). The controlled turbulent airflow around the airfoil is less fragile than a laminar flow and thus is much more difficult to separate from the airfoil. Even though there is a transition to controlled turbulence over the airfoil, there is less flow separation behind the transition, leading to reduced drag experienced by the airfoil. Also and for similar reasons, stall on the flocked airfoils 124, 126 and 128 is delayed and its effects are less severe relative to an unflocked airfoil 130. This may be because the surface roughness forces the air to follow the contour of the airfoil, thus delaying the onset of flow separation at higher angles of attack (α).

Figure 3:
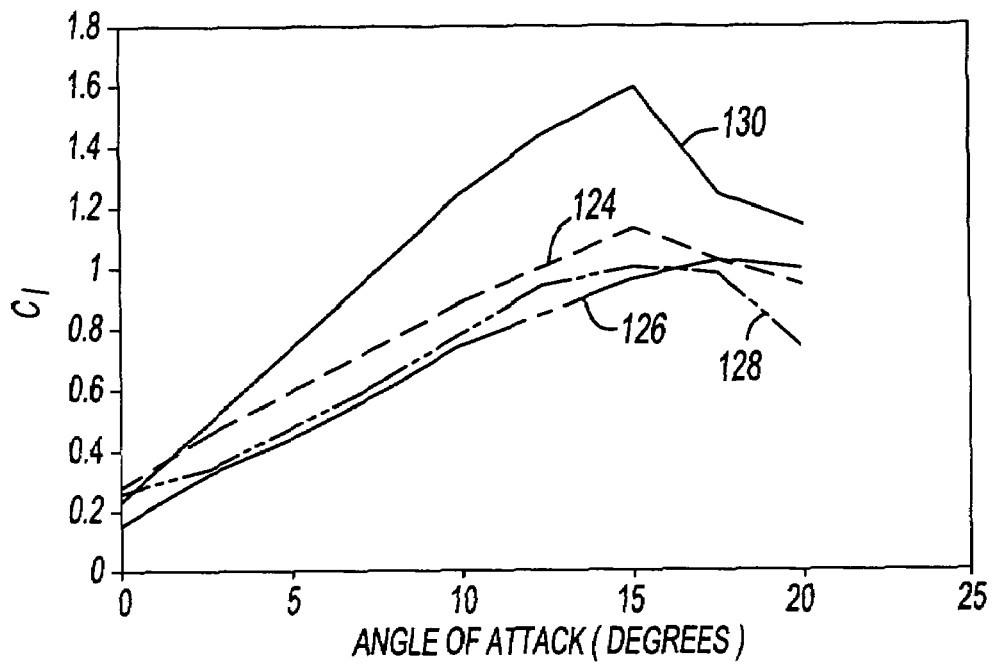
FIG. 3 is a comparison graph of a lift coefficient versus an angle of attack for an airfoil having three different flock lengths.

With reference to FIG. 3 and FIG. 4, flocking decreased the drag on the NACA 2412 airfoil throughout nearly the entire range of angles of attack (α). Although applying flocking had nearly no effect at α=0°, the drag is reduced increasingly as the angle of attack (α) is increased. Conversely, lift was decreased (i.e., decreased $C_l$) as well throughout the range of angles of attack (α). The lift, however, dramatically improves (i.e., increased $C_l$) beyond the stall angle (i.e., α>about 15°) as flocking may significantly improve stall conditions.

Figure 5:
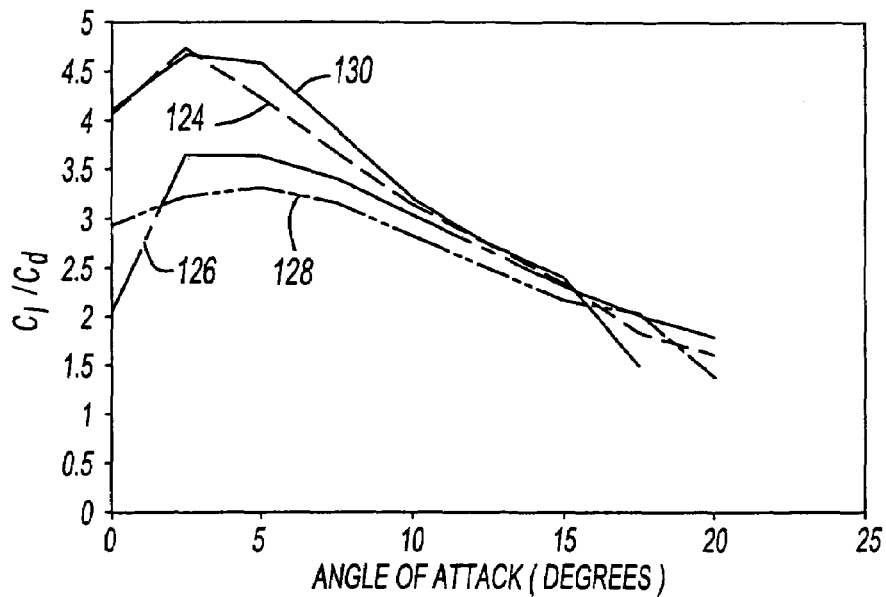
FIG. 5 is a comparison graph of a ratio of the lift coefficient to the drag coefficient versus the angle of attack for the airfoil having the three different flock lengths.

Referring to FIG. 5, the $C_l/C_d$ ratio, which measures a component of aerodynamic efficiency, maintained a similar profile for the short flock length 124 (0.5 mm fibers) at low angles of attack (i.e., α<about 5°). At larger angles of attack (i.e., α>about 5°), however, the $C_l/C_d$ ratio of the unflocked airfoil 130 is marginally higher until reaching stall conditions (i.e., α>about 15°), where the flocked airfoils 124, 126 and 128 show dramatic improvement.

Accordingly, the drag improvement provided by a uniform flocking treatment (e.g., uniform flocking density, flocking fiber length, flocking yarn density etc.) may have a beneficial effect on any exposed aerodynamic surface that is not relied upon to produce lift. Non-uniform applications of flocking (e.g., non-uniform flocking density, flocking fiber length, flocking yarn density etc.) may achieve the drag reduction while still maintaining suitable lift. Commercial and business aircraft, in particular, could reap large benefits from flocking 110, as these aircraft are generally at angles of attack less than five degrees in flight except for take-off, approach and landing, which may present other and more sizeable aerodynamic inefficiencies. The prolonged flight time at cruise conditions experienced by commercial, business and general aviation airplanes may reap the benefit from a relatively increased lift/drag ratio ($C_l/C_d$), which may result in increased weight capacity and/or reduced fuel consumption. It will be appreciated that while values are provided for angle of attack (α) for the above examples using a NACA 2412 airfoil, angle of attack (α) for other aircraft, airfoils and water-borne vessels may be different, and as such the disclosed values do not limit the present teachings.

Additionally, for aircraft that commonly fly near stall conditions, for example acrobatic aircraft, flocking 110 may be considered as it relatively reduces the negative effects of stall, although the lift at the stall angle of certain flocked airfoils is significantly less than that of an unflocked airfoil. Nevertheless, our results show that flocking may alter the aerodynamic characteristics of airfoils to relative benefit of the vehicle. Such modification may be controlled, in the above example, for predetermined angles of attack, by selecting a particular flock length, while keeping other flocking parameters, such as flocking density, flocking material, flocking orientation, etc., constant. Judicious modification of other flocking parameters may relatively improve aerodynamic control of the flocked airfoils particularly in adverse weather conditions winds. Weather-resistant coatings 116 may also be applied to the flock fibers 112 to improve aerodynamic performance in adverse conditions.

Figure 6:
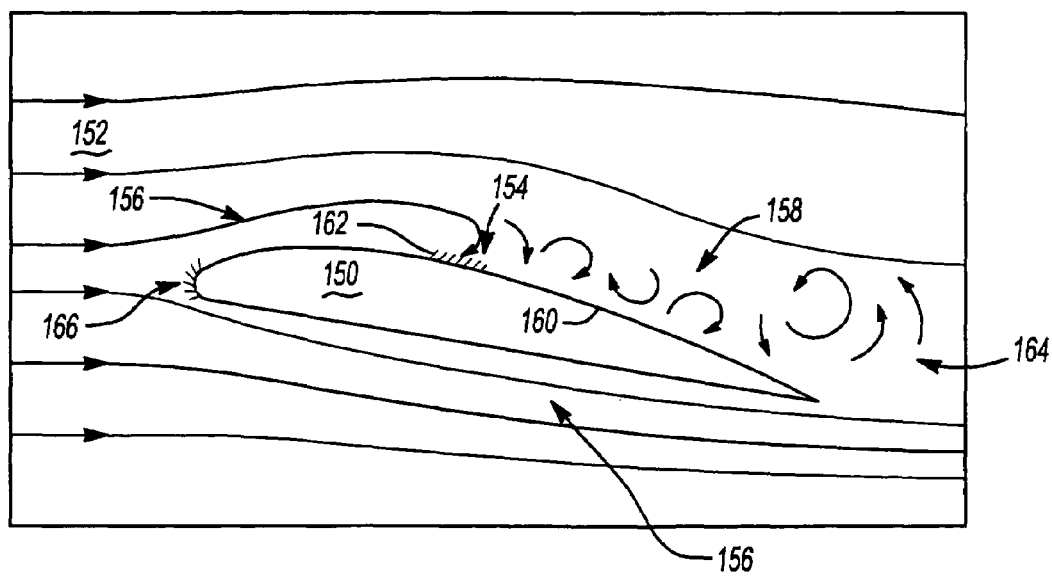
FIG. 6 is a section view of an airfoil according to the present teachings showing flocking on a portion of a surface.

With reference to FIG. 6, an exemplary airfoil 150 is shown. The exemplary airfoil 150 may be exposed to an airflow 152. In the airflow 152, there is a transition point 154 where the flow changes from a laminar flow 156 to a turbulent flow 158. A surface 160 of the airfoil 150 may contain a flocked portion 162. The flocked portion 162 may be positioned along the chord of the airfoil 150 at or about the transition point 154 between the laminar flow 156 and the turbulent flow 158. It will be appreciated that the flocked portion 162 may extend throughout the span (not shown) of the airfoil 150 or along portions thereof. By positioning the flocked portion 162 at or near the transition point 154, the transition from laminar flow 156 to turbulent flow 158 may be delayed. By delaying the transition, drag may be reduced over the airfoil 150. Moreover, positioning of the flocked portion 162 at predetermined positions along the chord of the airfoil 150 may delay turbulent flow separation 164 to further reduce drag experienced over the airfoil 150.

In another example, the flocked portion 162 may be positioned at and/or near a leading edge 166 (in addition to or in lieu of the flocked portion 162 at the transition point 154) in a spanwise direction to control turbulent flow 158 around the airfoil 150. By controlling the turbulent flow 158, there may be less flow separation 164 behind the transition point 154, leading to reduced drag experienced by the airfoil 150. Whether flocking 162 is positioned at or near the transition point 154 and/or at the leading edge 166, stall on the flocked airfoils 124, 126 and 128 may be delayed and its effects may be less severe relative to an unflocked airfoil 130 (FIGS. 3, 4 and 5). Moreover, positioning of the flocked portion 162 along the leading edge 166 may delay turbulent flow separation 164 to further reduce drag experienced over the airfoil 150.

Figure 7:
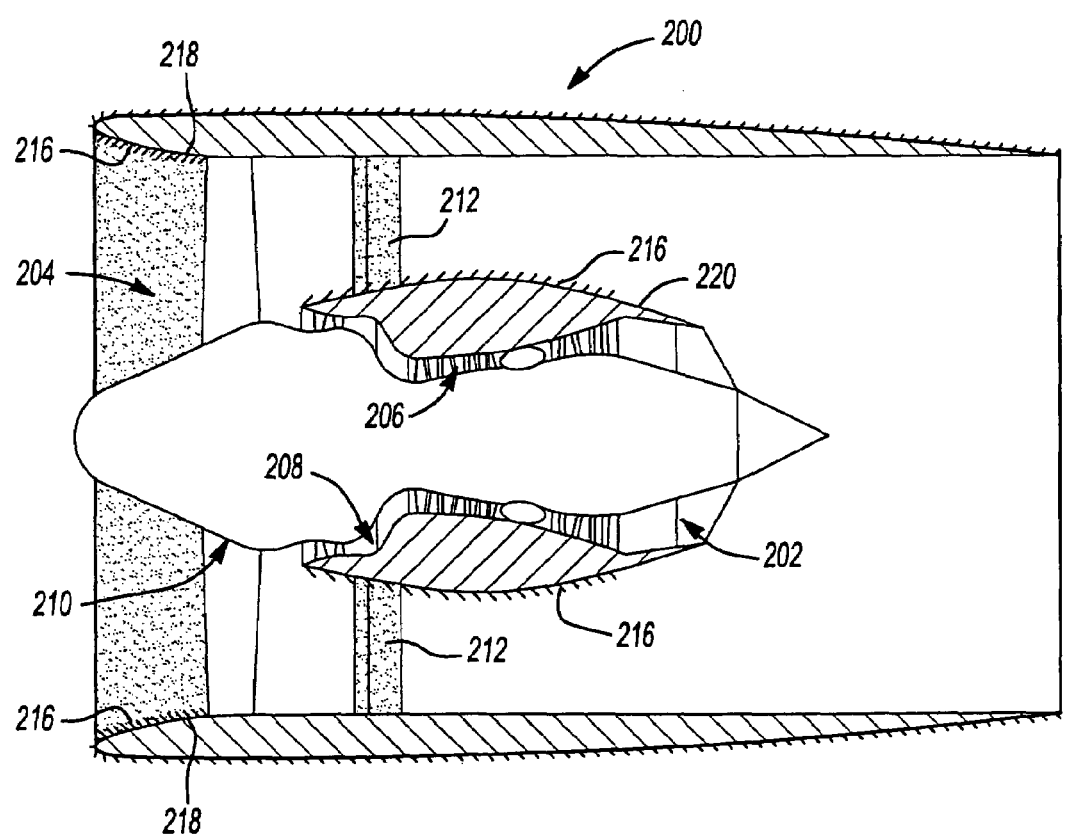
FIG. 7 is a section view of a turbine engine according to the present teachings showing flocking on a portion of the intake of the engine.

With reference to FIG. 7, a section of an exemplary turbine engine 200 is shown. The turbine engine 200 may include a hot section 202 and a cold section 204. The hot section may include a turbine 206 and a compressor 208. The cold section 204 may include low-pressure compressor 210. In addition, braces 212 may attach the hot section 202 of the engine 200 to an engine cowling 214. In one embodiment of the present teachings, flocking 216 may be attached to portions of the turbine engine 200. More specifically, flocking may be attached to the braces 212, interior surfaces 218 of the engine cowling 214, including portions of cowling 214 in front of (i.e., left of) the low-pressure compressor 210. By way of example, drag and noise can be reduced over the surfaces on which flocking 216 is attached. By reducing drag over the surfaces, volumetric flow through the engine 200 may be increased and noise production from the engine 200 may be decreased. Moreover, the efficiency of the engine 200 may be increased.

Figure 8A:
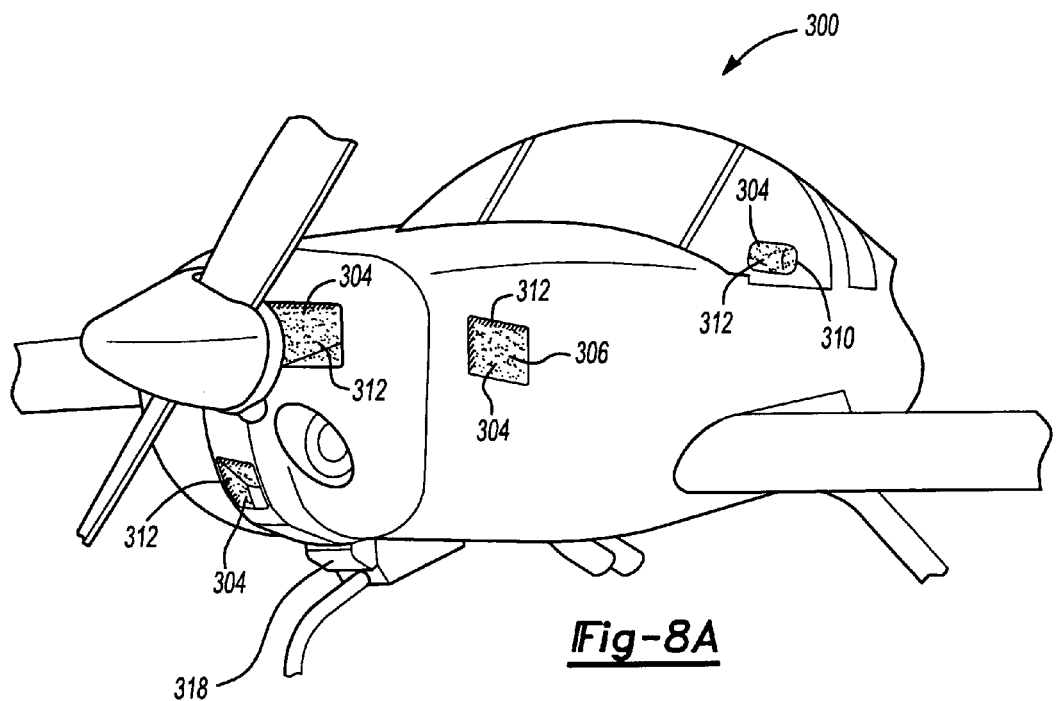
FIG. 8A is a perspective view of a portion of an airplane according to the present teachings showing flocking on predetermined portions of the cowling.
Figure 8B:
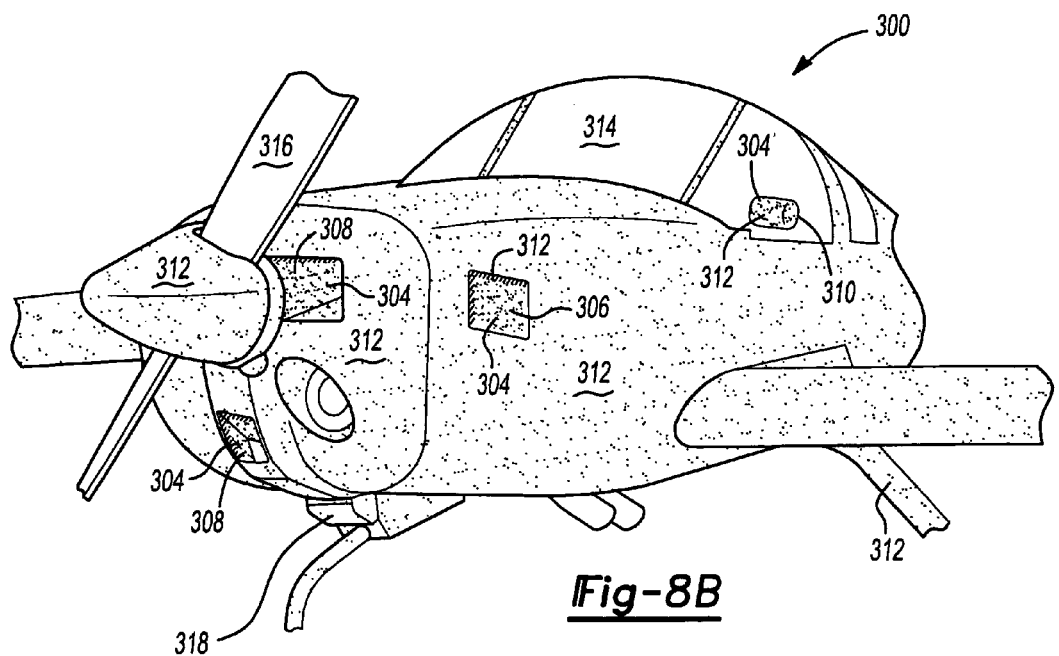
FIG. 8B is similar to FIG. 8A and shows the flocking over almost the entire exterior surface of the airplane.

With reference to FIG. 8A, an exemplary airplane 300 is shown. An exterior surface 302 of the airplane 300 may include various intake ports 304 that may, among other things, assist in cooling the engine and interior compartments of the airplane 300. The intake ports 304 may include, for example, a cowl flap 306 and engine intake 308 and a passenger compartment air scoop 310. Flocking 312 may be attached to at least a portion of the intake ports 304 to reduce intake noise and drag through the intake ports 304. By reducing drag through the intake ports 304, flow may be increased through the ports 304, which may increase the overall efficiency of the cooling and ventilation system of the airplane 300. With reference to FIG. 8B, the exemplary airplane 300 is shown with a flocking 312 attached to almost the entire airplane except for the windows 314 and the propeller blades 316. Flocking 312 may be attached to the windows 314 when the flocking process does not obstruct the line of sight therethrough. Moreover, flocking 312 may be attached to the propeller blades 316, when the angle of attack of the blades 316 would be such that the efficiency of the propeller would be increased due to increased thrust and/or decreased drag. Flocking 312 may also be attached to an exhaust port cowling 318 taking into account suitable thermal considerations. It will be appreciated that by attaching flocking 312 to the entire airplane 300 drag experienced by the airplane 300 may be reduced to thereby increase the efficiency of the airplane 300.

Figure 9A:
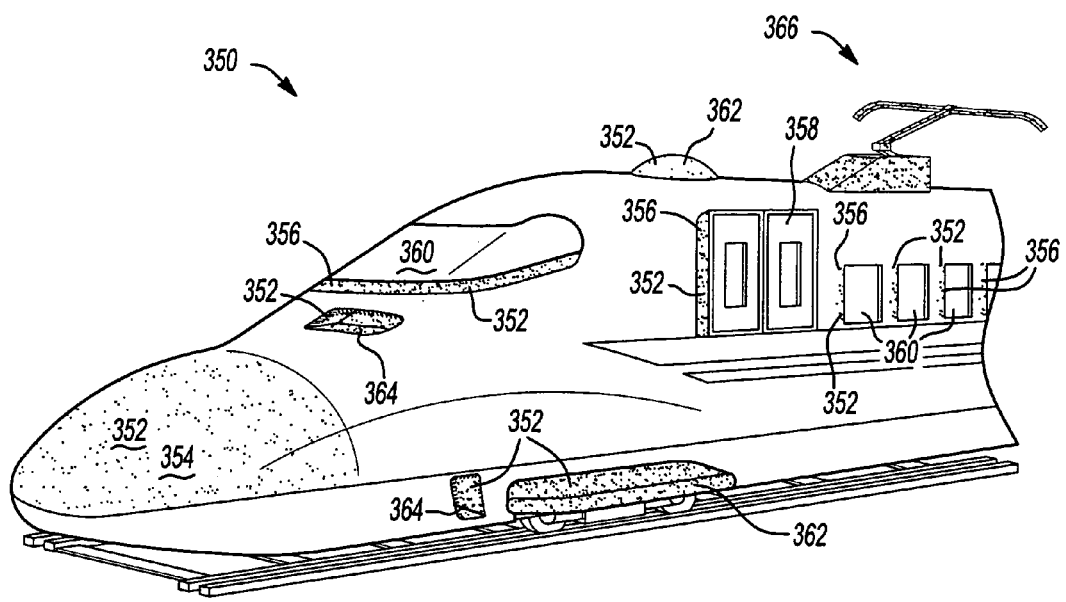
FIG. 9A is a perspective view of a portion of a train according to the present teachings showing flocking on predetermined portions of an exterior surface.

With reference to FIG. 9A, an exemplary train 350 is shown. Flocking 352 may be attached to specific portions of the train 350. More specifically, flocking 352 may be attached to a nose 354 of the train 350 and leading edges 356 of doorways 358, windows 360 and wheel and electronics system cowlings 362. In addition, air intakes 364 that may for example assist cooling of the engine, braking systems and/or passenger compartment may include flocking 352 attached in the intakes 364 to increase flow therethrough. Moreover, flocking 352 may be attached to an electrical current collector or pantograph 366 that may be configured to deliver electrical current to the train 350 (e.g., the Japanese Shinkansen). It will be appreciated that by attaching flocking 352 to portions of the train 350, drag and noise experienced by the train 350 may be reduced to thereby increase the efficiency of the train 350.

Figure 9B:
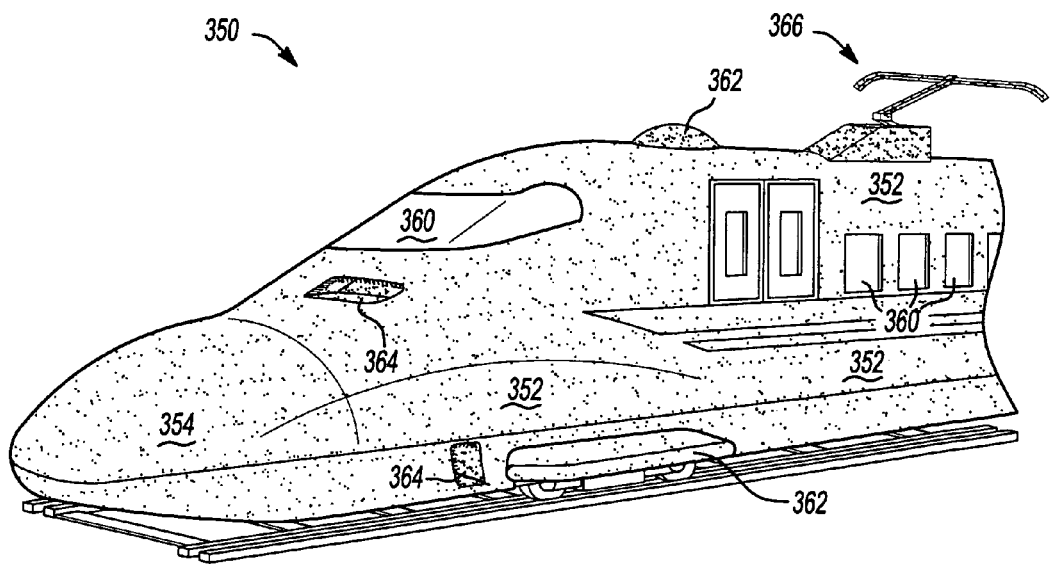
FIG. 9B is similar to FIG. 9A and shows the flocking over almost the entire exterior surface of the train.

With reference to FIG. 9B, the exemplary train 350 is shown with flocking 352 attached almost entirely over the train 350. By attaching flocking 352 to the entire train 350, drag and noise may be reduced over the train 350, which may increase the efficiency of the train 350 by reducing drag and thereby decreasing fuel consumption of the train 350.

Figure 10A:
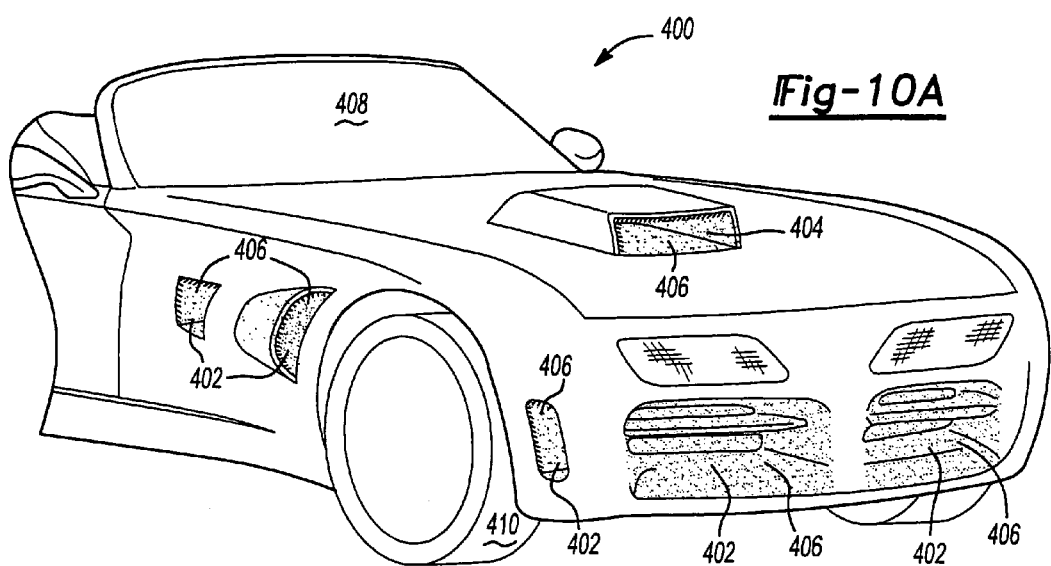
FIG. 10A is a perspective view of a portion of an automobile according to the present teachings showing flocking on predetermined portions of an exterior surface.

With reference to FIG. 10A, an exemplary automobile 400 is shown. The automobile may include a plurality of intake vents 402 to cool various portions of the automobile 400 including the engine, brakes and passenger compartment. In addition, the automobile 400 may include an intake scoop 404 to direct air into the engine. In one embodiment, the intake vents 402 and/or scoop 404 may have flocking 406 attached thereto. Attaching flocking 406 to the intake vents 402 and/or scoop 404 may increase volumetric flow into the intake 402 and/or scoop 404 and decrease drag thereover. An increase in volumetric flow through the intake 402 and/or scoop 404 and the decreased drag may ultimately result in decreased fuel consumption for automobile 400.

Figure 10B:
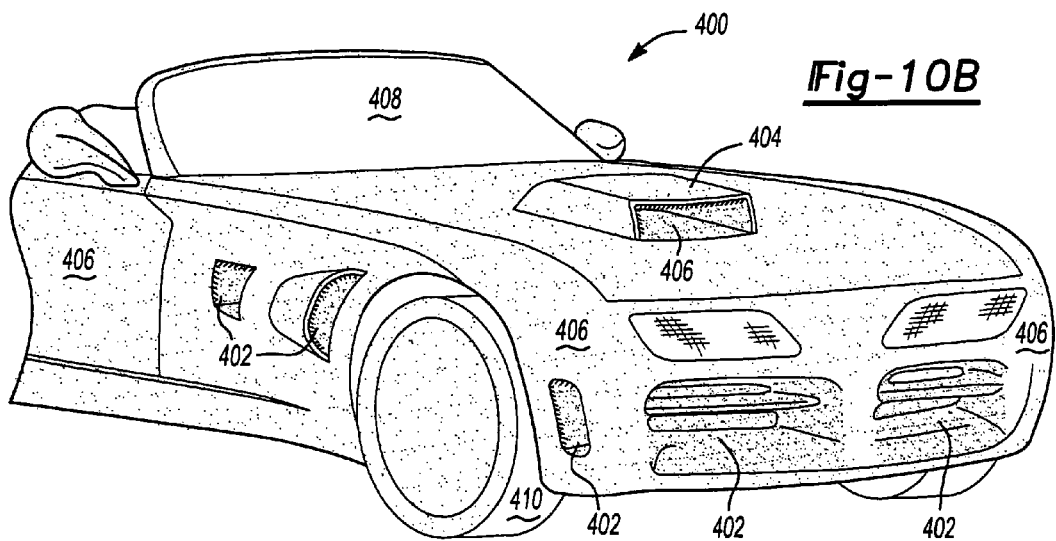
FIG. 10B is similar to FIG. 10A and shows the flocking over almost the entire exterior surface of the automobile.

With reference to FIG. 10B, the exemplary vehicle 400 may include flocking 406 attached over the entire vehicle 400 excluding windows 408 and the portions of the tire 410 that contact the road. By attaching flocking 406 to the entire automobile 400, drag over the entire vehicle may be reduced which thereby may increase efficiency of the automobile 400 and reduce fuel consumption. Flocking 406 may be attached to the windows 408 when the flocking process does not obstruct the line of sight therethrough. Moreover, flocking 406 may be attached to the portion of the tire 410 that contacts the road, when flocking process does not detract from grip of tire 410 and may decrease drag thereover.

With reference to FIG. 11, an exemplary side view mirror 450 is shown. It will be appreciated that the side view mirror 450 may be attached to myriad vehicles including cars, trucks, earth moving machinery and the like. The side view mirror 450 may include a mirror surface (not shown) and a mirror cowling 452. The mirror cowling 452 may be completely coated with flocking 454. It will be appreciated that by coating the entire mirror cowling 452 with flocking 454, drag and noise over the mirror cowling 452 may be reduced. By reducing drag over the mirror cowling 452 the efficiency of the vehicle (e.g., the automobile 400 in FIGS. 10A and 10B) to which the side view mirror 450 may be attached may also be increased. By reducing the drag for the entire vehicle, fuel consumption may be reduced.

With reference to FIG. 12, an exemplary sailboat 500 is shown. The sailboat 500 may include a cabin 502, a mast 504, a boom 506 and various compartments and access ways 508 in and throughout the boat 500. Flocking 510 may be attached to portions of the sailboat 500 that are above and/or within the water 514. More specifically, flocking 510 may be attached to the cabin 502, the mast 504, the boom 506 and a bow area 516 of the boat hull 512 to reduce drag and noise thereover. In other embodiments, flocking 510 may be attached to almost the entire sailboat 500. Again, by reducing drag and noise over the sailboat 500, the efficiency of the sailboat 500 may be increased. It will be appreciated that flocking may be attached to powerboats (i.e., no sails or sails in combination with an engine) whereby flocking will serve to reduce the drag over the boat and thereby reduce fuel consumption.

Figure 13:
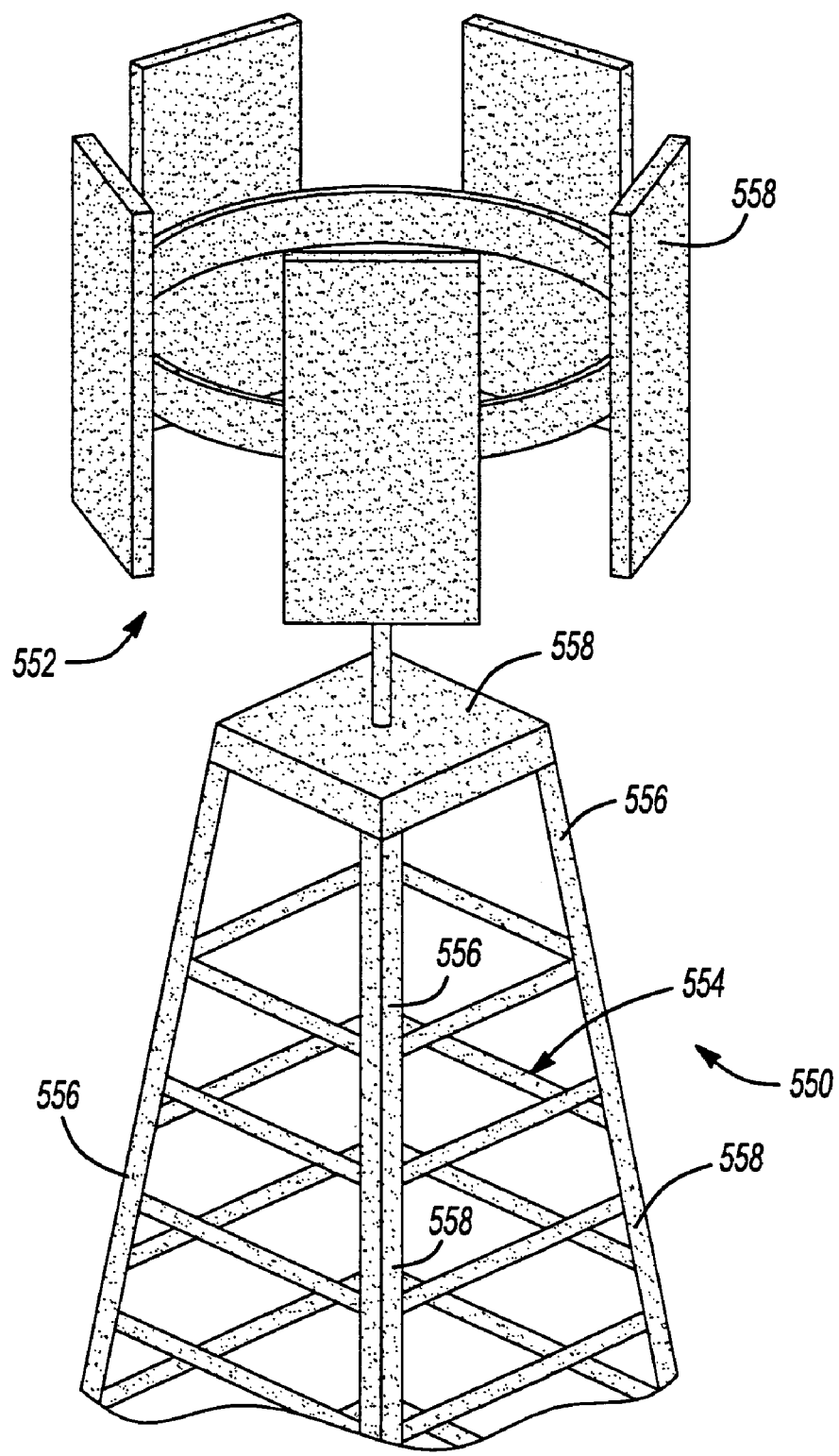
FIG. 13 is a perspective view of an antenna tower with an antenna array according to the present teachings showing flocking over almost the entire tower and the antenna array.

With reference to FIG. 13, an exemplary tower 550 and antenna array 552 are shown. The tower 550 may be a lattice-like structure 554 having three or four posts 556 that may extend from the ground and be connected to the antenna array 552. The antenna array 552 may be of various types including a cellular communication antenna array. Flocking 558 may be attached to portions of the antenna tower 550 and the antenna array 552 or the entire structure 550. By attaching flocking 558 to the entire structure 550, 552, wind resistance over the structure 550, 552 may be reduced and/or noise production by the structure 550, 552 may also be reduced. By reducing wind resistance and/or by reducing noise production, the tower 550 and the antenna array 552 may be more environmentally friendly. Furthermore, reduced wind resistance may reduce the weight and/or strength of the materials required to construct the tower 550 and/or antenna array 552.

Figure 14A:
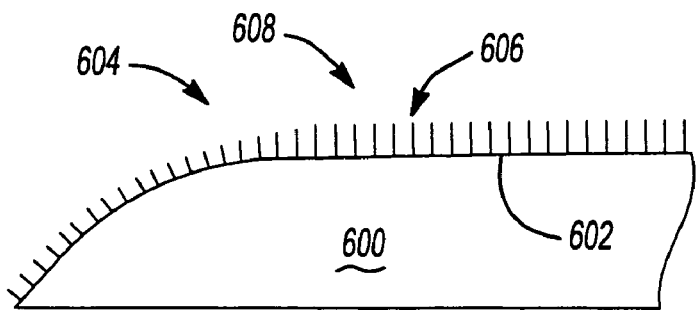
FIGS. 14A, 14B and 14C are section views of an aerodynamic surface showing flocking attached thereto having varying lengths on the same aerodynamic surface.
Figure 14B:
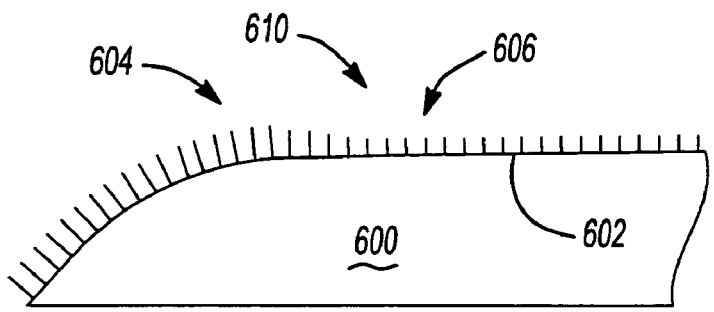
Figure 14C:
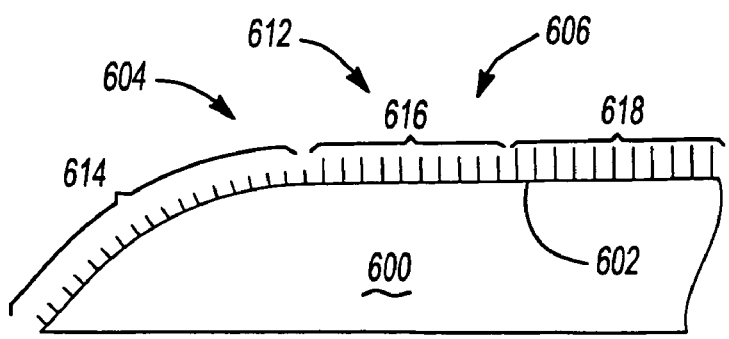

With reference to FIGS. 14A, 14B and 14C, an exemplary aerodynamic body 600 having an aerodynamic surface 602 is shown. The exemplary aerodynamic body 600 can be incorporated into various structures including, for example, the body part 100 (FIG. 1), the airfoil 150 (FIG. 6) and/or the turbine engine 200 (FIG. 7). Flocking 604 is attached to the aerodynamic surface 602 using various suitable methods. The height of the flocking 604 (i.e., the length of fibers 606) can be varied across the aerodynamic surface 602. In FIG. 14A, the flocking 604 may be shorter and gradually become longer (i.e., from left to right), as generally indicated by reference numeral 608. In FIG. 14B, the flocking 604 may be longer and gradually become shorter (i.e., from left to right), as generally indicated by reference numeral 610. In FIG. 14C, the flocking 604 may be shorter and gradually become longer (i.e., from left to right) in discrete steps (e.g., short length 614, medium length 616 and long length 618), as generally indicated by reference numeral 612. The changing height of the fibers 606 included in the flocking 604 may be based on changing fluid velocity of the aerodynamic surface 602. In other examples, the changing height of the fibers may be based on the height of a boundary layer (not shown) over the aerodynamic surface 602. It will be appreciated that localized changes in the fluid flow thereover, whether determined empirically or theoretically may provide a basis from which the length, width, flock density, yarn density or other characteristics of the individual fibers 606 may be determined and implemented. By varying the height etc. of the individual fibers 606 based on empirically and/or theoretically determined fluid flow characteristics, one or more above described aerodynamic characteristics may be altered.

It will again be appreciated by those skilled in the art that the teachings of the present invention may be alternatively employed on all forms of, including, but not limited to, vehicles cars, trucks, snowmobiles, amphibian vehicles/aircraft, jet skis, water craft, boats, helicopters, hover craft, hobby aircraft and flying discs and the like.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A body part comprising:
   a surface having a fluid flow thereover;
   flocking coupled to at least a portion of said surface that adjusts an aerodynamic characteristic relative to said surface that is devoid of said flocking; and
   at least a portion of an airfoil having said surface wherein said aerodynamic characteristic includes lift and said flocking is coupled to at least said portion of said surface to increase said lift produced by said airfoil for a predetermined range of angle of attack.

2. The body part of claim 1, wherein said aerodynamic characteristic includes drag and said flocking is coupled to at least said portion of said surface decreases said drag thereover.

3. The body part of claim 1, wherein said aerodynamic characteristic includes noise and said flocking is coupled to at least said portion of said surface decreases said noise therefrom.

4. The body part of claim 1, wherein said aerodynamic characteristic includes volumetric flow over said surface and said flocking is coupled to at least said portion of said surface increases said volumetric flow thereover.

5. The body part of claim 1, wherein said flocking includes one of a yarn density, a flocking density and combinations thereof selected to adjust said aerodynamic characteristic.

6. The body part of claim 1, wherein said flocking includes a dimension defining a length selected to increase said lift, said length includes a length distribution and wherein said length distribution is one of uniform and non-uniform.

7. The body part of claim 1, further comprising at least a portion of an airfoil having said surface wherein said aerodynamic characteristic includes a lift to drag ratio and said flocking is coupled to at least said portion of said surface to increase said lift to drag ratio experienced by said airfoil for a predetermined range of angle of attack.

8. The body part of claim 7, wherein said flocking includes a dimension defining a length, said length includes a length distribution selected to increase said lift to drag ratio for said predetermined range of angle of attack.

9. The body part of claim 1, further comprising at least a portion of an airfoil having said surface wherein said airfoil includes a leading edge and a trailing edge and said flocking includes fibers oriented at an angle acute to said surface such that a base of said fibers is positioned toward said leading edge and a tip of said fibers distal from said base is positioned toward said trailing edge.

10. The body part of claim 1, further comprising at least a portion of an airfoil having said surface wherein said airfoil includes a leading edge and a trailing edge, wherein said flocking includes fibers oriented at an angle acute to said surface such that a tip of said fibers is positioned toward said leading edge and a base of said fibers distal from said tip is positioned toward said trailing edge.

11. The body part of claim 1, further comprising at least a portion of an airfoil having said surface wherein said aerodynamic characteristic is a transition point from laminar flow to turbulent flow and said flocking is coupled to said portion of said surface and located near said transition point.

12. The body part of claim 11, wherein said flocking coupled to said portion of said surface located near said transition point delays one of the transition from said laminar flow to said turbulent flow, separation of said turbulent flow from said airfoil and a combination thereof.

13. The body part of claim 1, further comprising at least a portion of an airfoil having said surface wherein said aerodynamic characteristic is a transition point from laminar flow to turbulent flow and said flocking is coupled to said portion of said surface and located near a leading edge.

14. The body part of claim 13, wherein said flocking coupled to said portion of said surface located near said leading edge delays one of the transition from said laminar flow to said turbulent flow, separation of said turbulent flow from said airfoil and a combination thereof.

15. The body part of claim 1, wherein said flocking includes fibers randomly distributed over said portion of said surface.

16. The body part of claim 1, wherein said flocking includes fibers made of material selected from the group consisting of cotton, nylon, rayon, polyester, polyethylene, polyamide, acrylic, glass, coal, metal, carbon fiber, and combinations thereof.

17. The body part of claim 1, wherein said flocking includes fibers made of nylon 66.

18. The body part of claim 1, wherein said flocking includes fibers having a dimension that defines a length in a range of about 0.3 millimeters to about 5 millimeters.

19. The body part of claim 1, wherein said flocking includes fibers having a yarn density in a range of about 1.7 decitex to about 22 decitex (about 1.5 denier to about 19.8 denier).

20. The body part of claim 1, wherein said flocking includes fibers having a flocking density in a range of about 50 fibers per square millimeter to about 300 fibers per square millimeter.

21. The body part of claim 1 further comprising at least a portion of an airplane having said surface wherein said aerodynamic characteristic includes drag and said flocking coupled to at least said portion of said airplane decreases said drag thereover.

22. The body part of claim 1 wherein said flocking includes a dimension defining a length selected to adjust said aerodynamic characteristic and wherein said length changes along said surface.

23. The body part of claim 1 wherein said flocking includes a characteristic defining one of width, flocking density, yarn density and combinations thereof selected to adjust said aerodynamic characteristic and wherein said one of said width, said flocking density, said yarn density and said combinations thereof is based on localized fluid flow characteristics.

24. The body part of claim 1 wherein said localized fluid flow characteristics includes a boundary layer height.

25. The body part of claim 1, in combination with a vehicle.

26. A body part comprising:
a surface having a fluid flow thereover;
flocking coupled to at least a portion of said surface that adjusts an aerodynamic characteristic relative to said surface that is devoid of said flocking; and
at least a portion of an airfoil having said surface wherein said aerodynamic characteristic includes a lift to drag ratio and said flocking is coupled to at least said portion of said surface to increase said lift to drag ratio experienced by said airfoil for a predetermined range of angle of attack.

27. The body part of claim 26, wherein said flocking includes a dimension defining a length, said length includes a length distribution selected to increase said lift to drag ratio for said predetermined range of angle of attack.

28. The body part of claim 26 in combination with a vehicle.

29. The body part of claim 26, wherein said flocking includes fibers randomly distributed over said portion of said surface.

30. A body part comprising:
a surface having a fluid flow thereover;
flocking coupled to at least a portion of said surface that adjusts an aerodynamic characteristic relative to said surface that is devoid of said flocking; and
at least a portion of an airfoil having said surface wherein said airfoil includes a leading edge and a trailing edge and said flocking includes fibers oriented at an angle acute to said surface such that a base of said fibers is positioned toward said leading edge and a tip of said fibers distal from said base is positioned toward said trailing edge.

31. The body part of claim 30, in combination with a vehicle.

32. The body part of claim 30, wherein said flocking includes fibers randomly distributed over said portion of said surface.

33. The body part of claim 30, wherein said flocking includes fibers having a flocking density in a range of about 50 fibers per square millimeter to about 300 fibers per square millimeter.

34. A body part comprising:
a surface having a fluid flow thereover;
flocking coupled to at least a portion of said surface that adjusts an aerodynamic characteristic relative to said surface that is devoid of said flocking; and
at least a portion of an airfoil having said surface wherein said airfoil includes a leading edge and a trailing edge, wherein said flocking includes fibers oriented at an angle acute to said surface such that a tip of said fibers is positioned toward said leading edge and a base of said fibers distal from said tip is positioned toward said trailing edge.

35. The body part of claim 34, in combination with a vehicle.

36. The body part of claim 34, wherein said flocking includes fibers randomly distributed over said portion of said surface.

37. The body part of claim 34, wherein said flocking includes fibers having a flocking density in a range of about 50 fibers per square millimeter to about 300 fibers per square millimeter.

38. A body part comprising:
a surface having a fluid flow thereover;
flocking coupled to at least a portion of said surface that adjusts an aerodynemic characteristic relative to said surface that is devoid of said flocking; and
at least a portion of an airfoil having said surface wherein said aerodynamic characteristic is a transition point from laminar flow to turbulent flow and said flocking is coupled to said portion of said surface and located near said transition point.

39. A body part of claim 38, wherein said flocking coupled to said portion of said surface located near said transition point delays one of the transition from said laminar flow to said turbulent flow, separation of said turbulent flow from said airfoil and a combination thereof.

40. A body part at claim 38, in combination with a vehicle.

41. A body part comprising:
a surface having a fluid flow thereover;
flocking coupled to at least a portion of said surface that adjusts an aerodynamic characteristic relative to said surface that is devoid of said flocking; and
at least a portion of an airfoil having said surface wherein said aerodynamic characteristic is a transition point from laminar flow to turbulent flow and said flocking is coupled to said portion of said surface and located near a leading edge.

42. A body part of claim 41, in combination with a vehicle.

43. A body part of claim 41, wherein said flocking includes fibers randomly distributed over said portion of said surface.

44. A body part comprising:
a surface having a fluid flow thereover;
flocking coupled to at least a portion of said surface that adjusts an aerodynamic characteristic relative to said surface that is devoid of said flocking; and
at least a portion of an airplane having said surface wherein said aerodynamic characteristic includes drag and said flocking coupled to at least said portion of said airplane decreases said drag thereover.

45. A body part of claim 44, in combination with a vehicle.

* * * * *